US008321902B2

(12) United States Patent
Greene et al.

(10) Patent No.: US 8,321,902 B2
(45) Date of Patent: *Nov. 27, 2012

(54) MULTILEVEL BANDWIDTH CHECK (75) Inventors: Robert F. Greene, Lone Tree, CO (US); Richard T. Brownrigg, Castle Rock, CO (US); John C. Beyler, Chappaque, NY (US); Rebecca R. Lim, Englewood, CO (US); John S. Fukuda, Denver, CO (US)

(73) Assignee: Starz Entertainment, LLC, Englewood, CO (US)

( * ) Notice: Subject to any disclaimer, the term of this patent is extended or adjusted under 35 U.S.C. 154(b) by 159 days.

This patent is subject to a terminal disclaimer.

(21) Appl. No.: 12/869,648

(22) Filed: Aug. 26, 2010

(65) Prior Publication Data
US 2011/0047582 A1 Feb. 24, 2011

Related U.S. Application Data (63) Continuation of application No. 11/382,215, filed on May 8, 2006, now Pat. No. 7,797,721.

(60) Provisional application No. 60/678,255, filed on May 6, 2005.

(51) Int. Cl.
*H04N 7/173* (2011.01)

(52) U.S. Cl. .................................. 725/107; 725/116

(58) Field of Classification Search .................. 725/1–8, 725/37–61, 86–104, 106–134, 136–142
See application file for complete search history.

(56) References Cited

U.S. PATENT DOCUMENTS

2005/0261824 A1* 11/2005 Furukawa .................... 701/201

* cited by examiner

*Primary Examiner* — Vivek Srivastava
*Assistant Examiner* — Alfonso Castro
(74) *Attorney, Agent, or Firm* — Kilpatrick Townsend & Stockton LLP (57) ABSTRACT

A subscription system for providing content by subscription using an Internet connection is disclosed. The subscription system includes a content object store and an interface. The content object store stores a plurality of content objects. The interface is configured to receive a request to initiate a subscription with a first address for a particular account using the Internet. The subscription allows use of the plurality of content objects by the particular account without individually charging for the plurality of content objects. It is verified that a first connection speed is greater than a first threshold value before allowing the subscription, where the first connection speed is over the Internet with the first address. A request to access the subscription of the particular account is received from a second address with the Internet. It is verified that a second connection speed is greater than a second threshold value. The second connection speed is over the Internet with the second address. The second threshold value is associated with at least one of a product or a level of service for the subscription.

20 Claims, 4 Drawing Sheets

MULTILEVEL BANDWIDTH CHECK

This application is a continuation of U.S. application Ser. No. 11/382,215 filed on May 8, 2006, now U.S. Pat. No. 7,797,721 entitled "MULTILEVEL BANDWIDTH CHECK", which claims the benefit of U.S. Provisional Application No. 60/678,255 filed on May 6, 2005, entitled "Multilevel Bandwidth Check", each of which is hereby expressly incorporated by reference in its entirety for all purposes.

BACKGROUND OF THE INVENTION

This application relates to content delivery. More specifically, this application relates to ensuring compliance with geographical license restrictions on content delivery and to ensuring threshold service levels are met.

There are a number of methods of delivering content to customers. Some such methods deliver the programming directly to a individual business or residence by using satellite, microwave, UHF, VHF, broadband, or cable to a set-top box of a user. Most content is available according to a linear schedule published in programming guides. Certain additional services are available with some of these delivery systems, such as pay-per-view (PPV), video-on-demand (VOD), and near-video-on-demand (NVOD). A PPV service allows a user to purchase the right to play an entertainment program according to a linear schedule. A VOD service provides a user with the ability to access an entertainment-program stream at any desired time. A NVOD service is a hybrid service where an entertainment program is available on a number of different channels in a linear program with staggered start times.

Each of the PPV, VOD, and NVOD services store the program content remote from the user for delivery on a dedicated or shared channel. Both PPV and NVOD services provide programming broadcast according to a linear schedule, with multiple users sharing that single channel. In contrast, the VOD service singlecasts the program content on a dedicated or logically-separate channel available to a single user. For broadband program distribution, a server accessible over the Internet allows download of programs with a VOD experience to a local drive on a computer.

Other mechanisms for delivering content to users use physical distribution mechanisms such as digital versatile disks (DVDs). Typically such distribution mechanisms are provided for rent in a shop that is physically visited by a customer, who either pays for a one-time rental fee or who has a subscription package entitling the customer to borrow a certain number of the distribution mechanisms in a specified time period. More recently, such a rental model has been expanded to use conventional postal services for distribution. That is, a customer may provide a list of desired programming to a company, which mails a DVD to a customer, who watches the programming and returns the DVD by mail when complete; upon receipt of a returned DVD, the company mails the DVD having the programming identified next on the customer's list.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

This application describes methods and systems for implementing a content subscription service over a public network such as the Internet. While the description is provided in terms of a subscription to entertainment programming, the invention has more general applicability to a variety of different types of content subscription services. In particular, the invention is especially useful where delivery of the content may be subject to geographical restrictions and where the customer experience in receiving the content is highly dependent on the ability to transmit the content at sufficient rates or a quality of service (QoS). The delivery of entertainment programming is an example of this more general type of content delivery since entertainment programs may frequently be subject to geographical restrictions on distribution and are sensitive to transmission speeds. If the rate at which the entertainment program is delivered is too slow, the user experience in viewing the program may be unsatisfactory. As used herein, "entertainment programming" is intended to refer to a plurality of "entertainment programs," each of which is a sequence of visual images and synchronized audio produced for distribution as entertainment. Examples of entertainment programs thus include movies, television programs, and the like. For convenience, "entertainment programs" are sometimes referred to herein as "programs," the terms intended to be synonymous.

Figure 1A:
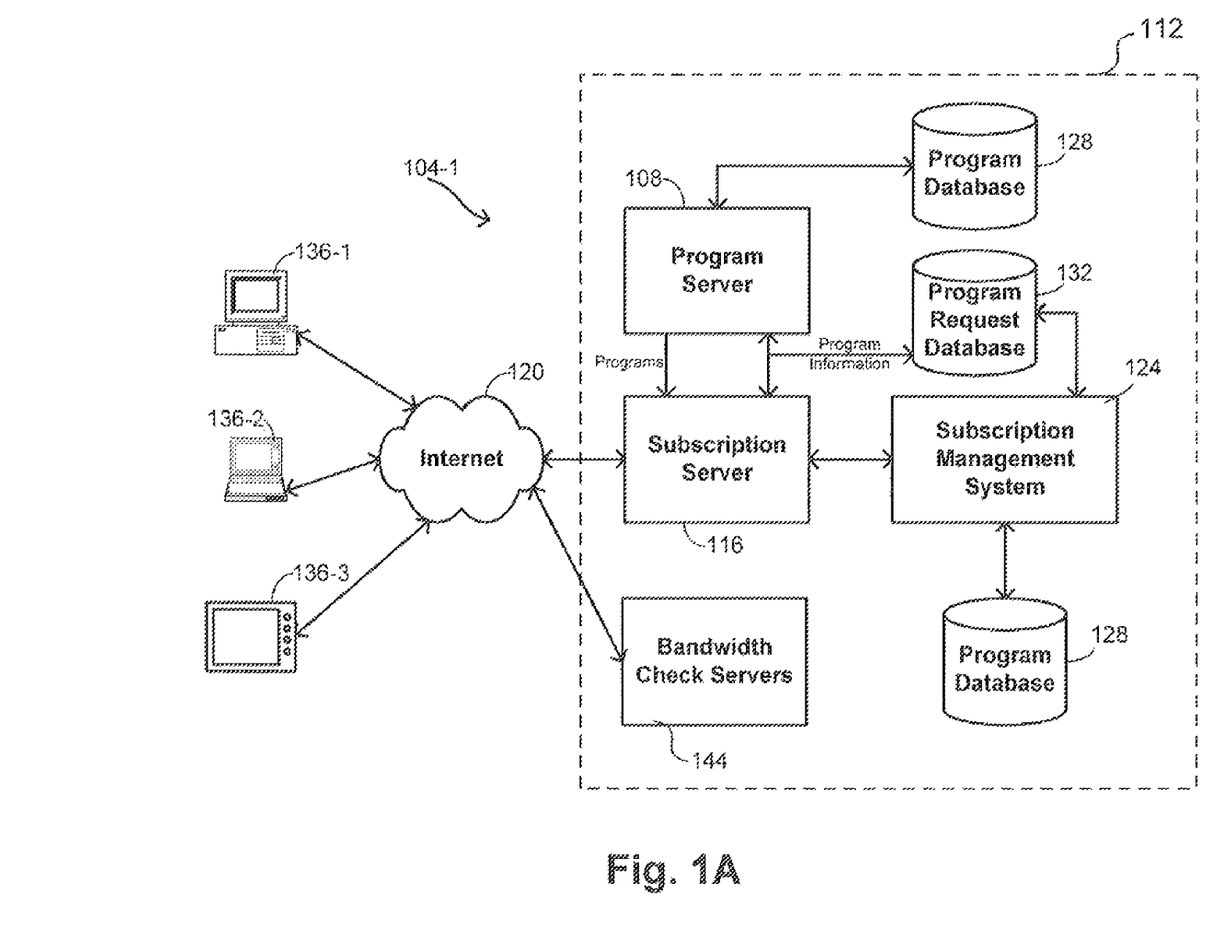
FIG. 1A is a block diagram that provides a schematic illustration of an embodiment of a content-delivery system.

An overview of a system that may be used for the delivery of content, in particular for the delivery of entertainment programming, is shown schematically in FIG. 1A. The content-delivery system 104-1 includes a subscription system 112 interfaced with a public network or wide area network such as the Internet 120 to communicate with various customer computers 136. There are many computers or devices 136 associate with various user accounts that communicated with the subscription system 112. The subscription system 112 includes a subscription server 116, a program server 108, a subscription management system 124, a program database 128, a customer information database 148, a bandwidth check server 144, and a program request database 132.

Program information is stored in the program database 128 and program-request information is stored in the program-request database 132. Customers interface with the system 112 using computers 136 interfaced with the public network 120. The interface between the Internet 120 and the subscription system 112 allows a pathway for the interaction. The customer computers or devices 136 may comprise a desktop computer 136-1; a portable computer 136-2 such as a laptop, with the portability provided by the portable computer 136-2 conveniently permitting downloaded content to be moved to different locations; a portable media player 136-3; a set top box; or any other device than can play entertainment programs for a user.

The subscription management system 124 coordinates overall management of customer subscriptions to the downloading/streaming service. In addition, interactive screens for selecting services are formulated by the subscription management system 124. The screens allow the customer to select additional products and/or services levels. Some embodiments use an application, API and/or applet on the customer computer 136 to provide some or all of the service interface. In any event, the subscription management system 124 is generally aware of the interaction with the downloading/streaming service to manage proper operation.

The subscription server 116 stores content that is provided for distribution over the public network 120 using a program server 108. Programs are stored in compressed digital form. In one embodiment, MPEG-4 compression is used, although this is not a requirement of the invention and other algorithms such as MPEG-2, H.264, VC-1, WindowsMedia™, RealVideo™, or QuickTime™ may be used for compressing the program content. The programs may be downloaded from a program database 128 by a program server 108 or may provided on removable storage media such as tapes or disks. Additionally, real-time content may be provided over the public network 120 as part of a simulcast or live streaming service.

The customer information database 148 stores information about each account and the associated computing devices 136. The account-specific information includes such information as name, address, IP address, membership history, available credit, and the like, as well as a history of programs that have been downloaded by each customer, specifying each program, when it was downloaded, etc. In addition, the customer information database 132 may store parental control information that restricts the type of programs that may be downloaded according to content classifications and customer specifications. Additionally, computer 136 bandwidth test results are stored in the program-request database 132. In one embodiment, these test results are stored according to IP address or computer device.

The program-request database 132 stores programming information. Programming information includes such information as schedules for simulcast programming distribution, program descriptions, program reviews, program ratings, upcoming specials, and the like. Usage restrictions for digital rights management (DRM) are stored in the program-request database. These restrictions could have one or more time windows, geographic limitations on where downloaded or streamed, number of viewing limits, etc.

Both the program server 108 and the subscription management system 124 may interact with the program-request database 132. For example, the program server 108 may provide information to the program-request database 132 when programming is downloaded to manage compliance with subscription requirements and to provide information that may be used for customer billing and the like. The subscription management system 124 may use information stored on the program-request database 132 and customer information database 148 for accounting purposes and for formulating menu screens presented to the user. For example, a customer might wish to know the account balance or to review a history of programs that have previously been downloaded. This usage information is stored in the customer information database 148 and used by the subscription management system 124 in administering the content-delivery system 104.

Bandwidth checks are performed on the content-delivery system 104 with the bandwidth check server 144 to select products and their various levels of service that the product might have. The bandwidth check may involve download of a test file or stream. The bandwidth check is redone at login every time the IP address changes for a computer 136 in this embodiment. Other embodiments might store prior test results for a number of IP addresses or a range of IP addresses. Should a new IP address be detected, prior bandwidth tests for that IP address or a similar IP address might be used instead of performing a new test. Some embodiments expire test results after a period of time to prevent no longer accurate results from being retained. The bandwidth check in this embodiment involves downloading a file from the subscription system 112 or another location across the Internet 120.

Customers who have subscriptions to the content may be provided with a number of options for viewing content. For example, a customer may at times wish merely to check program times from a guide, may at other times wish to view program previews, or may wish to view an entire program. The connection-speed requirements for such different activities may vary, with the highest connection speeds being needed for downloads of the largest file sizes. These activities are fall into products and any further level of service options for the product. For example, the product may be content streaming at a 600 kbits/sec level of service. Embodiments of the invention may impose threshold connection-speed requirements in order to register a subscriber and/or to permit a subscriber to perform certain activities.

In addition, since distribution of the content may be restricted geographically, often so that distribution may take place only within a national territorial limit, connection speeds are monitored for each access to ensure that the content is not being accessed through a dial-up connection. While geolocation using IP address lookup may be accomplished for broadband connections, and used to verify compliance with the distribution restrictions, dial-up connections may be accessed from anywhere in the world, such as by using long-distance telephone calls.

Figure 1B:
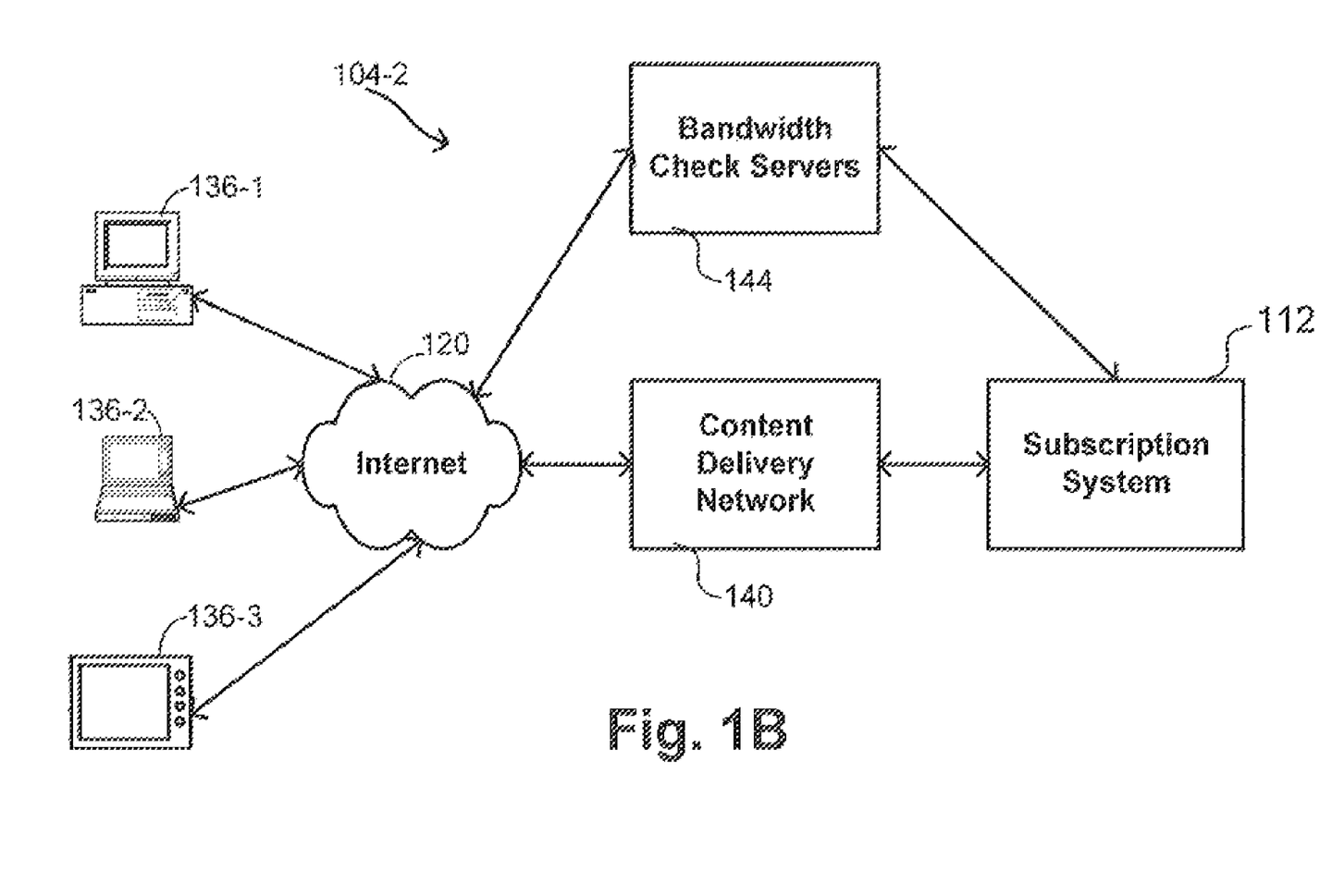
FIG. 1B is a block diagram that provides a schematic illustration of another embodiment of the content-delivery system.

FIG. 1B is a block diagram that provides a schematic illustration of another embodiment of the content-delivery system 104-2. This embodiment uses a content delivery network (CDN) 140 to aid in distribution of content objects. A CDN 140 caches and/or hosts content objects in a manner not easily discernable by users. Often, QoS is enhanced by CDNs 140 by having edge servers geographically distributed to bring content objects closer to end users. It is likely that the CDN 140 will serve a particular content object from an edge server closer to the user than the subscription system 112.

It is difficult to predict the ultimate QoS with a bandwidth check from the subscription system 112 alone. This embodiment has bandwidth check servers 144 distributed geographically. Rather than doing a test to a location of the subscription system 112, which is unlikely to ultimately deliver the content object, the check can be done from one of the bandwidth check servers 144 likely to have similar delivery characteristics to the CDN edge server that is likely to be chosen. For example, it may be determined that a user is located in Miami.

The nearest CDN point of presence could be in Ft. Lauderdale. The closest bandwidth check server 144 could be in Jacksonville. A bandwidth check of downloading a sample file from the Jacksonville bandwidth check server 144 is performed by an applet or application on the user computer 136. The results from the bandwidth check are reported to the subscription system 112 and the products and service levels are adjusted accordingly.

Figure 2:
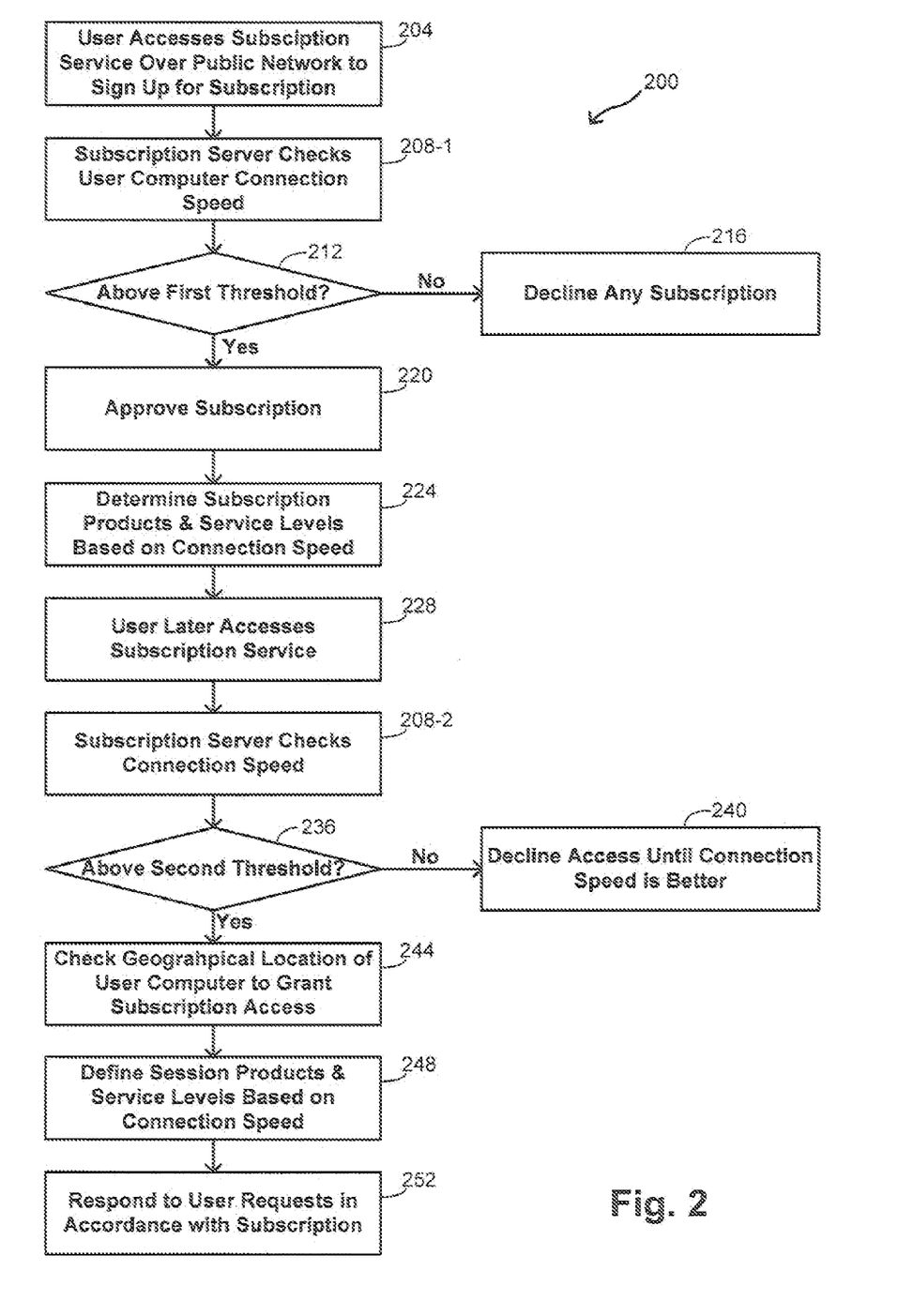
FIG. 2 is a flow diagram illustrating a method for implementing a content subscription service in accordance with embodiments of the invention.

An overview of exemplary embodiments is provided with process 200 in the flow diagram of FIG. 2 that demonstrates bandwidth checking for the subscription system 112. At block 204, a user initially accesses a subscription system 112 over a public network like the Internet 120 to sign up for a subscription to the content-delivery service. Once login is configured and completed, a subscription session is active through an Internet connection, for example. A subscription session allows downloading and streaming a package of content objects or programs that are not charged for separately. For example, there might be a group or groups of programs provided in a package that is paid for in bulk. The constituent programs in a group may be changed periodically to provide variety in one embodiment. The subscription system 112 may also have programs that are charged for individually, such as PPV programs.

As part of the sign-up process, the subscription system 112 and/or a bandwidth check server 144 verifies the connection speed with the user computer 136 at block 208-1. There are a variety of different techniques known to those of skill in the art that may be used to check the connection speed and the invention is not limited to any particular technique. The bandwidth test may be done with application software or without in various embodiments. In this embodiment, the test is initiated with a download and monitored remote to the user computer 136. A check is made at block 212 that the connection speed is above a first threshold value, generally selected to ensure that sufficient bandwidth will exist to accommodate products and any levels of service for the subscription. For example, in one embodiment where media files to be downloaded may be as large as about 500-600 Mbytes, the first threshold may be approximately 600 kbits/sec in one embodiment. If the connection speed is less than the first threshold, the subscription may be declined at block 216, usually with an indication to the potential subscriber that the connection speed is insufficient to provide the subscriber with satisfactory functionality.

If the connection speed is adequate, the subscription product and any service level may be approved at block 220, with the customer then providing billing, location, and other such information used in administering the subscription. In some instances, the nature of the subscription service may be determined at block 224 in accordance with the connection speed. For instance, the content delivery may take a variety of different forms, some requiring a connection speed 300 kbits/sec and others requiring a connection speed of 600 kbits/sec. In such instances, the first threshold may be set at 300 kbits/sec, with customers signing up with a connection speed between 300 and 600 kbits/sec being given a limited service, and with customers having connection speeds greater than 600 kbits/sec being given an enhanced service at block 224. In other instances, the level of service may be graduated according to even finer levels, providing three, four, five, or more different levels of service depending on the available connection speed at sign up. One embodiment allows escalating service levels at higher bandwidths such as pay-per-view download at 100 kbits/sec, subscription program download at 300 kbits/sec, live streaming at 600 kbits/sec, and high definition streaming at 1.5 megabits/sec. For example, a bandwidth test finding 768 kbits/sec capability would qualify for pay-per-view product, subscription download product, and live streaming product at the lower-level of service, but not high definition streaming.

Some time after the user has signed up for the service, the user may attempt to access the subscription service again at block 228. Such attempts may be initiated at the same user computer 136 used to sign up for the service, but might also be initiated from other user computers 136 using different types of connections and/or locations. When a login is performed, a check of the IP address is performed by the server or client software. Should a new IP address be used, bandwidth tests are performed again. Some embodiments could remember a number of IP addresses and the results of their bandwidth test. Movement between any of these previously used IP addresses would not require a new bandwidth test. As bandwidth tests age, older test results could be deleted such that a new test is performed when that IP address is used again.

In this embodiment, the client software controls the bandwidth check. The client software stores the IP address(es). During load of the client software, the current IP address is checked against the stored IP address used last time. Where the current IP address is unfamiliar or unlikely to yield a reliable bandwidth measurement, the client software can initiate a bandwidth check using the check server 144. Where there are more than one check servers 144, the one likely to yield the best results can be referenced. This address check and/or bandwidth check can be performed before even contacting the subscription server in some embodiments. Although this embodiment stores the last IP address in the client software, other embodiments could store this in the subscription system 112 to initiate a check from the server-side if there are changes.

A second bandwidth test is performed at block 208-2. A check is made at block 236 whether the connection speed being used to attempt to access the subscription is greater than a second threshold. The second threshold is less than the first threshold and is greater than conventional dial-up connection speeds. For example, in one embodiment, the second threshold is 100 kbits/sec in this embodiment. Accordingly, access is denied at block 240.

In other embodiments, the second threshold is greater than the first threshold. The first threshold is used to determine if the user qualifies for any product and the second threshold is used to determine the products and levels of service the user will be given on a particular computer or at a particular location. For example, the first threshold could be 100 kbits/sec, which would screen out dial-up connections and some other lower speed technologies. The minimum product qualification only allows the pay-per-view product in this embodiment, but bandwidth beyond that could allow for enhanced products and service levels. The subsequent bandwidth checks could determine what products at what level of service is provided for a particular session. The sole Table lists various service level and product minimums for one embodiment. The minimum qualification is the lowest level of product or service that a computer or location can do. Bandwidths below the minimum qualification would be rejected as below the first threshold.

TABLE

Product and Service Levels

| Product | Service Level | Minimum Bandwidth |
| --- | --- | --- |
| Minimum Product Qualification | — | 100 kbyte/sec |
| Pay-per-view | — | 100 kbyte/sec |

TABLE-continued

Product and Service Levels

| Product | Service Level | Minimum Bandwidth |
|---|---|---|
| Subscription Download | Standard | 300 kbyte/sec |
| | High-Definition | 1000 kbyte/sec |
| Streaming | Standard | 600 kbyte/sec |
| | Medium | 800 kbyte/sec |
| | High-Definition | 1500 kbyte/sec |

If the connection speed is greater than the second threshold, a check may reliably be made of the geographical origin of the attempted access, such as by performing an address IP lookup. If the geographical origin is consistent with geographical restrictions on distributing the content, access is granted at block 244. In some instances, the level of access granted may differ from the service level defined at block 224, such as where the customer is connected at a slower connection speed. For instance, referring further to the example discussed above, even if the customer had signed up for the subscription service while connected with a connection speed of 700 kbits/sec, he may now be connected only at 400 kbits/sec. The geographic check can be performed at any time in the process before block 224 or just when the IP address or computer changes. The original service that was authorized at block 224 might include features available only to those having a connection speed greater than 600 kbits/sec, with those features not being provided for the session defined at block 248.

As indicated at block 252, the customer may then use the features provided in accordance with the level of service for the subscription, with the subscription server 116 responding to requests initiated by the customer. Some embodiments remove access and promotion to programs not available at their current connection speed. For example, a login at a new IP address might result in a bandwidth of 340 kbits/sec. Even though access to high definition content were allowed, those programs would be hidden from selection by the user at this IP address. If a subsequent bandwidth test was above 1.5 megabits/sec, all the high definition programs would be available once again.

In some instances, the session service level may be modified by performing periodic checks of connection speed, increasing or decreasing the level of functionality depending on the connection speed. Furthermore, in some cases the periodic checks may be used to derive a running average connection speed. Such a derivation advantageously allows service to be maintained at the appropriate level despite intermittent changes in connection speed. For instance, if the average connection speed is about 350 kbits/sec, but varies between 375 kbits/sec and 425 kbits/sec. Use of the running average would not downgrade service to level available to those having speeds less than 300 kbits/sec each time the connection speed varies briefly below that level.

The above embodiment checks bandwidth when initially subscribing or on subsequent login. Another embodiment performs the first check to qualify for the product. Where there are multiple service levels for that product, a second check finds the most appropriate service level. This check could be done at login or before accessing a program offered by the product. For example, the computing device 136 may qualify for 600 kbits/sec streaming product at an earlier time. A program that is selected for streaming may be available as a 300, 600, or 1,000 kbits/sec streams. Before the stream starts, a bandwidth check is performed to see what level can be streamed at that time such that the user may get the 1,000 kbits/sec QoS if the Internet connection would support it at that time. In some cases, the user may be given the option of the several QoS levels at launch of the stream where more than one service level is supported.

In some embodiments, the different service levels could be dynamically interchanged during streaming. If a stream fell below the minimum for adequate QoS, a lower QoS stream could be seamlessly switched over to. Some embodiments could show a status indicator to notify the user of the switch. Background bandwidth checks could be used to switch back to a higher QoS if the Internet connection improves.

Figure 3:
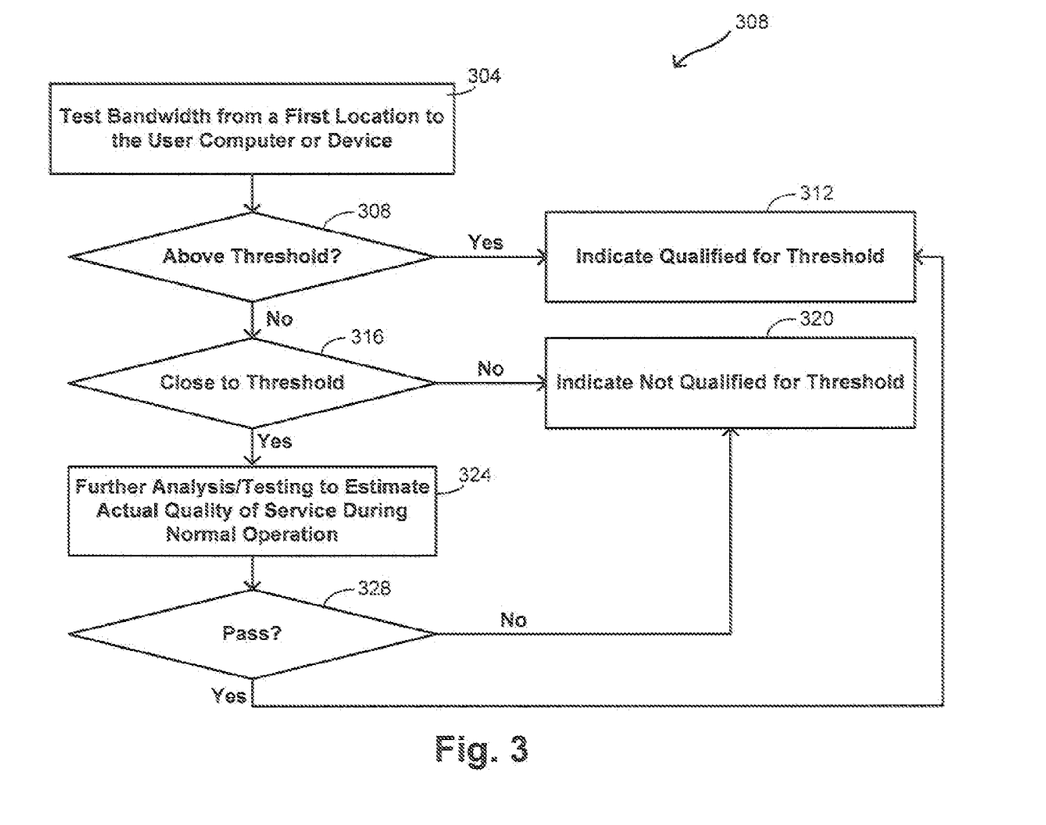
FIG. 3 is a flow diagram illustrating a method for implementing a bandwidth check in accordance with embodiments of the invention.

FIG. 3 is a flow diagram illustrating a method 208 for implementing a bandwidth check in accordance with embodiments of the invention. This method or process performs a bandwidth check using a content-delivery system 104 like that of FIG. 1A. The depicted part of the process begins in block 304 where the bandwidth is checked between the subscription system 112 to the user computer 136. If it is determined that the bandwidth is above a threshold for the product or service level in block 308, processing continues to block 312 where the subscription system 112 is notified of the successful test. Where the bandwidth is below the threshold, processing continues to block 316 to determine if the bandwidth is close to the threshold. For example, it might be close enough if 5%, 10%, 15%, or 20% below the threshold. If not within a predetermined percentage from the threshold, the test fails in block 320.

If close to the threshold, processing continues from block 316 to block 324. In this embodiment, results within 10% of the threshold are referred to block 324. This embodiment tests from a selected bandwidth check server 144 more likely to give an accurate indication of the bandwidth in block 324. Another embodiment determines the number of hops between the subscription system 112 and the user computer 136. If there are only a few hops, it is presumed that the bandwidth test is accurate, but if there are too many hops, the accuracy of the bandwidth test goes down with the number of hops. For example, for a 300 kbits/sec threshold might have screened a test result of 275 kbits/sec. If there was only a single hop between the subscription system 112 and the user computer 136, those results are likely not to improve with delivery. However, if there were 12 hops, the test result were likely to be inaccurate. If the revised test criteria in block 324 passes in block 328, processing goes to block 312. Upon a failure of the revised test criteria, processing goes to block 320.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

For a software implementation, the techniques, processes and functions described herein may be implemented with modules (e.g., procedures, functions, and so on) that perform the functions described herein. The software codes may be stored in memory units and executed by processors. The memory unit may be implemented within the processor or external to the processor, in which case the memory unit can be communicatively coupled to the processor using various known techniques.

A number of variations and modifications of the disclosed embodiments can also be used. For example, some embodiments may include games, audio books and/or music as entertainment programs. The above systems and methods can be used to deliver these and all types of content objects using the appropriate codecs for doing so.

Some of the above embodiments talk of bandwidth testing as an activity separate from content downloading. Another embodiment could note bandwidth speeds during normal operation and update the customer information database for that computer or IP address accordingly. Filtering could be used to average a number of readings for a particular IP address or computer in some embodiments.

While the principles of the disclosure have been described above in connection with specific apparatuses and methods, it is to be clearly understood that this description is made only by way of example and not as limitation on the scope of the disclosure.

What is claimed is:

1. A subscription video system for providing content by subscription using an Internet connection, the subscription video system comprising:
a program database for storing a plurality of video content objects, and
an interface configured to receive a request to initiate a subscription with a first Internet Protocol (IP) address for a particular account using the Internet, wherein:
a first connection bandwidth over the Internet to the first IP address is determined to be greater than a first threshold value before initiating the subscription for the particular account,
a request to access the subscription of the particular account is received from a second IP address, wherein the request is received after the subscription for the particular account is initiated,
a second connection bandwidth over the Internet to the second IP address is determined to be:
greater than a second threshold value before providing access to a first product or a first level of service relating to the subscription, and
less than a third threshold for access to a second product or a second level of service relating to the subscription,
the first IP address is different from the second IP address, and
the first threshold is different than the second threshold.

2. The subscription video system as recited in claim 1, wherein the use allowed by the subscription video system comprises at least one of content object download or content object streaming.

3. The subscription video system as recited in claim 1, further comprising a data store that stores connection bandwidth information relating to at least one of the first IP address and the second IP address.

4. The subscription video system as recited in claim 3, wherein the connection bandwidth information is used to determine at least one of the first connection bandwidth and the second connection bandwidth.

5. The subscription video system as recited in claim 4, wherein the connection bandwidth information relating to the first IP address used to determine the second connection bandwidth.

6. The subscription video system as recited in claim 3, wherein the data store is configured to store the connection bandwidth information for a certain period of time.

7. The subscription video system as recited in claim 1, wherein the interface comprises a first interface, the subscription video system further comprising a second interface configured to a send a test file or stream, wherein information regarding download of the test file or stream is used to determine at least one of the first connection bandwidth and the second connection bandwidth.

8. A method for providing a subscription to video content over a public network, the method comprising:
receiving a request to initiate the subscription for a particular account from a first IP address over the public network;
verifying that a first connection bandwidth is greater than a first threshold value, wherein the first connection bandwidth is over the public network with the first IP address;
after verification, approving the subscription for the particular account to be activated;
receiving a request to access the subscription for the particular account from a second IP address over the public network;
verifying that a second connection bandwidth is greater than a second threshold value; and
approving the request to access the subscription for the particular account from the second IP address over the public network, wherein:

the second threshold value is associated with a first level of service of the subscription, the second connection bandwidth is less than a third threshold value associated with a second level of service of the subscription, the first IP address is different from the second IP address, the first threshold is different than the second threshold, and the second connection bandwidth is over the public network with the second IP address.

9. The method recited in claim 8, further comprising verifying that a geographical location of the second user computer is consistent with geographical subscription limitations.

10. The method recited in claim 8, wherein the approving the subscription for the particular account comprises initiating the subscription with a product level chosen based upon the first connection bandwidth.

11. The method recited in claim 8, wherein verifying that the second connection bandwidth is greater than the second threshold value includes using information associated with the second IP address regarding a bandwidth test conducted prior to receiving the request to access the subscription.

12. The method recited in claim 8, further comprising storing information regarding a bandwidth test associated with the second IP address.

13. The method recited in claim 12, further comprising removing, after a certain period of time, the information regarding the bandwidth test associated with the second IP address.

14. The method recited in claim 8, further comprising reconfiguring an interface to the subscription to remove access and promotion of programs associated with the second level of service of the subscription.

15. The method recited in claim 8, wherein the subscription allows use of a plurality of programs without individually charging for the plurality of programs.

16. The method recited in claim 8, wherein the second threshold value is less than the first threshold value.

17. The method recited in claim 8, further comprising monitoring the second connection bandwidth over a session accessing the subscription.

18. A method for providing a subscription to video content using a wide area network, the method comprising:

receiving a request to initiate the subscription for a particular account from a first IP address over the wide area network, wherein the subscription allows use of a plurality of programs without individually charging for the plurality of programs;

verifying that a first connection bandwidth is greater than a first threshold value, wherein the first connection bandwidth is over the wide area network with the first IP address;

initiating the subscription for a particular account to a product, based, at least in part, on the verifying the first connection bandwidth;

receiving a request to access the subscription for a particular account from a second IP address over the wide area network; and verifying that a second connection bandwidth is greater than a second threshold value, wherein:

the second connection bandwidth is over the wide area network with the second IP address, the first IP address is different from the second IP address, the first threshold is different than the second threshold, and the second threshold value is associated with at least one of a first level of service of the subscription, the second connection bandwidth is less than a third threshold value, the third threshold value being associated with at least one of second level of service of the subscription.

19. The method recited in claim 18, wherein the testing are performed with software running on the first or second user computers.

20. The method recited in claim 18, wherein:

the first level of service of the subscription and the second level of service of the subscription are associated with the product.

\* \* \* \* \*

UNITED STATES PATENT AND TRADEMARK OFFICE
CERTIFICATE OF CORRECTION

PATENT NO. : 8,321,902 B2
APPLICATION NO. : 12/869648
DATED : November 27, 2012
INVENTOR(S) : Robert F. Greene et al.

It is certified that error appears in the above-identified patent and that said Letters Patent is hereby corrected as shown below:

In the Specification:

Column 3, line 33, please insert --be-- after the word may.

Signed and Sealed this
Twenty-sixth Day of February, 2013

Teresa Stanek Rea
*Acting Director of the United States Patent and Trademark Office*